(12) United States Patent
Schelhaas

(10) Patent No.: US 10,247,566 B2
(45) Date of Patent: Apr. 2, 2019

(54) ELECTRONIC NAVIGATION SYSTEM

(71) Applicant: SAP SE, Walldorf (DE)

(72) Inventor: Christian Schelhaas, Walldorf (DE)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 15/387,679

(22) Filed: Dec. 22, 2016

(65) Prior Publication Data
US 2018/0180434 A1    Jun. 28, 2018

(51) Int. Cl.
G01C 21/36 (2006.01)
G06N 99/00 (2010.01)
G01C 21/34 (2006.01)
G06Q 10/10 (2012.01)

(52) U.S. Cl.
CPC ....... G01C 21/362 (2013.01); G01C 21/3492 (2013.01); G06N 99/005 (2013.01); G06Q 10/1095 (2013.01)

(58) Field of Classification Search
CPC .................... G01C 21/362; G06N 99/005
See application file for complete search history.

(56) References Cited

U.S. PATENT DOCUMENTS

| | | | |
|---|---|---|---|
| 2011/0137954 A1 | 6/2011 | Diaz | |
| 2014/0229099 A1* | 8/2014 | Garrett | H04W 4/028 701/465 |
| 2014/0278051 A1* | 9/2014 | McGavran | G01C 21/00 701/400 |
| 2014/0278086 A1* | 9/2014 | San Filippo | G01C 21/3423 701/527 |
| 2017/0147951 A1* | 5/2017 | Meyer | G06Q 50/14 |

FOREIGN PATENT DOCUMENTS

| | | |
|---|---|---|
| EP | 2369299 A1 | 9/2011 |
| WO | WO-2014013295 A1 | 1/2014 |

OTHER PUBLICATIONS

Search Report for corresponding European Application No. 16206278.0 dated Feb. 16, 2017.

* cited by examiner

Primary Examiner — Anshul Sood
(74) Attorney, Agent, or Firm — Harness, Dickey & Pierce, P.L.C.

(57) ABSTRACT

An electronic navigation system configured to receive a user's entry of calendar data of a planned event into an electronic calendar, including an indication of a point of time, a geographic location, and metadata descriptive of the planned event; enter the calendar data into a user specific trained classifier; process the calendar data by the user specific trained classifier to provide a classification result indicating whether a trip is required to participate in the planned event; if a trip is required, generate and send a request including the geographic location to a second server; generate navigation data including a predicted time duration for the trip, and return a response including the navigation data to the first server; generate and send a dynamic reminder message including the navigation data to the user's telecommunication device a variable amount of time before the planned event based on the predicted time duration.

20 Claims, 6 Drawing Sheets

ELECTRONIC NAVIGATION SYSTEM

TECHNICAL FIELD

This invention relates to methods and systems for navigation. In particular, this invention relates to an effective navigation using data based on user behavior.

BACKGROUND

A lot of public web services offer navigation services. Users have their trips planned by providing their departure geographic locations and destination geographic locations. A planning of a trip can comprise various optional trip routes for different transportation means, such as for instance car, train, aircraft, etc. The planning of the trip can comprise predicted time durations of the trip specified for different transportation means. The planning of the trip can be actualized before the trip or during the trip. As usual the trips are planned and actualized using average settings which are applied for a lot of users requesting trip planning. The settings can comprise average car speed, an average speed of a cyclist or a pedestrian, etc. Some trip planning public web services can monitor trip context information like road traffic jams, changes in schedules of public transportation, weather. The trip planning can be updated in accordance with the actual trip context information.

SUMMARY

A type of transportation is, as understood here, one of the following: car, bus, train, plane, boat, and bicycle. The type of transportation "car" corresponds to a case when any motorized vehicle arranged for transportation of less than 9 persons (e.g. a car) is used for transportation of a person. The type of transportation "bus" corresponds to a case when any motorized vehicle arranged for transportation of more than 8 persons (e.g. a bus) is used for transportation of a person. The type of transportation "train" corresponds to a case when any train carriage arranged for transportation of passengers per railway is used for transportation of a person. The type of transportation "plane" corresponds to a case when any motorized airplane arranged for transportation of passengers by air is used for transportation of a person. The type of transportation "boat" corresponds to a case when any motorized vessel arranged for transportation of passengers by water is used for transportation of a person. The type of transportation "bicycle" corresponds to a case when any bicycle is used for transportation of a person.

The disclosure generally describes an electronic navigation system, a navigation method using the electronic navigation system, and a computer-readable media storing computer executable instructions for executing the navigation method. The aforementioned inventive solutions can be used for planning of a plurality of trips for a user, wherein the planning of the trips can be performed using the user specific preferences. The user specific preferences are derived using behavior of the user registered by the navigation system. The navigation system comprises various components, wherein the navigation system is configured to provide effective distribution of the work load between the components. The bulk of trip planning and providing navigation is performed by server computers, while the work load of a battery powered telecommunication device assigned to the user is minimized. The minimization of work load of the telecommunication device is implemented by reducing its communication with the server computers and/or by causing the server computers to perform the bulk of data processing related to trip planning, its actualization, and navigation. In addition, the server computers are configured to adapt trip planning data and/or navigation data in accordance with user specific behavior. The adaptation can be made in conjunction with context information related to planning of the trip and/or navigation using the planned trip. Further, the navigation system can support planning of different trips in conjunction with each other.

One of the practical aspects of the present invention can be illustrated on the following example. Almost any user when planning his trip plans his trip to the planned event such that he arrives before the planned event, but not immediately at the beginning of the planned event. This way of planning ensures that the user does not arrive late for the planned event. For instance, when the user receives information from a navigation system that the planned trip will take 3 hours to the panned event, then he will probably depart 4 or 3.5 hours before the planned event in order to compensate for (unexpected) delays when executing the planned trip (e.g. road traffic jams, or user driving style, which can depend on whether conditions during the trip, etc.). In the other words, the user plans extra time for execution of the trip. This approach based on the "rule of thumb" cannot be considered effective and practical. Thus there is a need to bridge a gap between publicly available information related to planning and executing of trips to events and the actual need for navigating users to the events in an effective way. The need for effective navigation gets much more prominent for users which travel a lot between different events. In this case, planning of extra time for travelling between the events can be very critical. Time interval between planned events can be quite tight and extra time planned for the trip can result in an acceptable increase in time duration of the trip which can be longer than the time interval between the planned events. In this case the user will face a dilemma to cancel his participation in one of the events or take a risk to arrive late for one of the events.

It is an objective of embodiments of the invention to provide for an electronic navigation system operable for providing user specific navigation information, a computer-implemented method for navigation using the electronic navigation system, and a computer readable medium having stored thereon a computer executable program code for executing the computer-implemented method.

According to one embodiment, the present invention relates to an electronic navigation system. The electronic navigation system comprises: a mobile battery powered telecommunication device being assigned to a user, a first server computer for providing an electronic calendar and a user specific trained classifier, the electronic calendar being configured to store calendar data of events, a second server computer comprising a navigation module. The telecommunication device, the first server computer, and the second server computer are communicatively coupled by a telecommunication network. The electronic navigation system is configured to perform the following: receiving user's entry of calendar data of a planned event into the electronic calendar via the telecommunication device, the calendar data of the planned event comprising at least an indication of a point of time, a geographic location, and metadata being descriptive of the planned event; in response to the user's entry of the calendar data, reading the calendar data of the planned event by the first server computer and entering of the calendar data into the user specific trained classifier; processing of the calendar data of the planned event by the user specific trained classifier to provide a classification result, the classification result being indicative of whether a trip of the user is required to participate in the planned event; if no trip is required, generating a static reminder message by the first server computer and sending the static reminder message to the telecommunication device in order to provide a reminder to the user a fixed amount of time before the planned event; if a trip is required, generating a request by the first server computer, the request comprising at least the geographic location, and sending the request from the first server computer to the second server computer; in response to the request, generating navigation data by the navigation module, the navigation data comprising a predicted time duration for the trip, and returning a response from the second server computer to the first server computer comprising the navigation data; generating a dynamic reminder message by the first server computer, the dynamic reminder message comprising the navigation data, and sending the dynamic reminder message of variable amount of time before the planned event to the telecommunication device; the variable amount of time being given by the predicted time duration of the trip; and rendering the navigation data on a display of the telecommunication device.

According to another embodiment, the present invention relates to a computer-implemented method for navigation using an electronic navigation system. The electronic navigation system comprises: a mobile battery powered telecommunication device being assigned to a user, a first server computer for providing an electronic calendar and a user specific trained classifier, a second server computer comprising a navigation module. The electronic calendar is configured to store calendar data of events. The telecommunication device, the first server computer, and the second server computer are communicatively coupled by a telecommunication network. The method comprises the following: receiving user's entry of calendar data of a planned event into the electronic calendar via the telecommunication device, the calendar data of the planned event comprising at least an indication of a point of time, a geographic location, and metadata being descriptive of the planned event; in response to the user's entry of the calendar data, reading the calendar data of the planned event by the first server computer and entering of the calendar data into the trained classifier; processing of the calendar data of the planned event by the user specific trained classifier to provide a classification result, the classification result being indicative of whether a trip of the user is required to participate in the planned event, if no trip is required, generating a static reminder message by the first server computer and sending the static reminder message to the telecommunication device in order to provide a reminder to the user a fixed amount of time before the planned event; if a trip is required, generating a request by the first server computer, the request comprising at least the geographic location, and sending the request from the first server computer to the second server computer; in response to the request, generating navigation data by the navigation module, the navigation data comprising a predicted time duration for the trip, and returning a response from the second server computer to the first server computer comprising the navigation data; generating a dynamic reminder message by the first server computer, the dynamic reminder message comprising the navigation data, and sending the dynamic reminder message of variable amount of time before the planned event to the telecommunication device, the variable amount of time being given by the predicted time duration of the trip; and rendering the navigation data on a display of the telecommunication device.

According to another embodiment, the present invention relates to a computer readable medium having stored thereon a computer executable code for execution by a computer processor controlling a computer system, wherein execution of the instructions of the executable code causes the computer processor to execute the computer-implemented method of the aforementioned embodiment.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
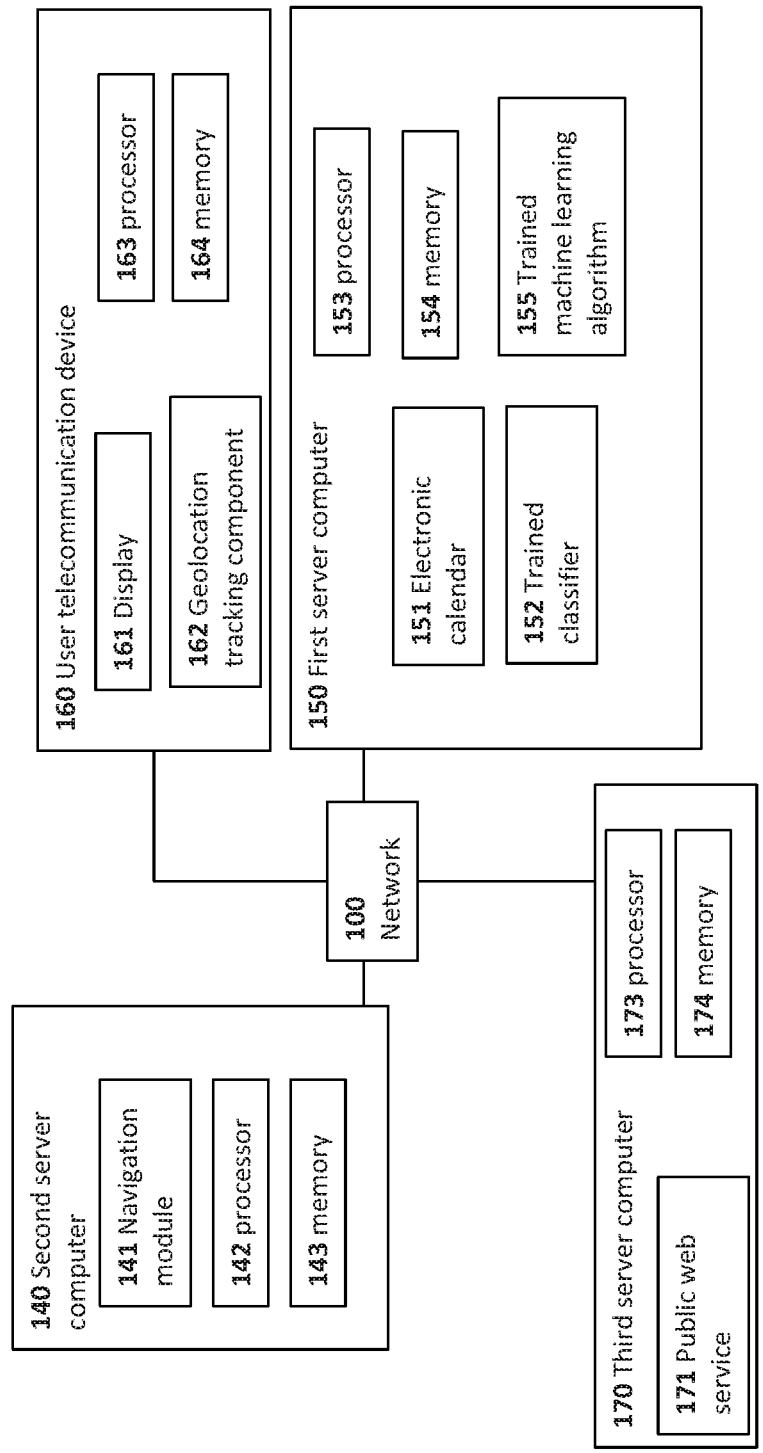
FIG. 1 is a block diagram illustrating an example environment for navigation.

This disclosure generally describes computer-implemented methods for navigation and trip planning, computer-readable media storing computer executable code for execution of the computer-implemented methods, and electronic navigation systems being operable for execution of the computer-implemented methods. Calendar data of the events is stored in an electronic calendar on a server computer. The electronic calendar stores calendar data of the events which are planned, currently ongoing, and occurred in the past. The server computer analyses the calendar data of the events occurred in the past in conjunction with the behavior of the user during these events and/or during trips to and/or from these events. This analysis provides for an effective planning and execution of trips to the planned events using publicly available information. The computer server is communicatively coupled to a battery powered telecommunication device assigned to a user. The bulk of trip planning and navigation is executed by the computer server in conjunction with one or more public server computers providing public information related to planning and execution of the trip. In its own turn, the telecommunication device provides to the server computer information related to planned events and receives from it trip planning and navigation information which can be updated by the server computer in relation with changes in context information related to the trip.

According to another embodiment, the telecommunication device comprises a geolocation tracking component. The electronic navigation system is configured to perform the following: registering by the geolocation tracking component a geographic location of the user during the planned event; appending by the telecommunication device classification data to the calendar data of the planned event, the classification data being indicative of a personal presence of the user at the planned event when the geographic location of the user is the same as the geographic location of the planned event, otherwise the classification data being indicative of a remote participation of the user in the planned event; generating by the first server computer the user specific trained classifier by training a machine learning algorithm for classification using calendar data of events occurred in the past, the calendar data of the events occurred in the past being stored in the electronic calendar, wherein the generating by the first server computer of the user specific trained classifier by training the machine learning algorithm for the classification comprises training the machine learning algorithm for classification to map a set of input data to a set of output data, the set of input data comprising indications of points of time of the events occurred in the past, metadata being descriptive of the events occurred in the past, and geographic locations of the events occurred in the past, the set of output data comprising classification data of the events occurred in the past. The processing of the calendar data by the trained classifier comprises: generating by the first server computer classification data using the trained machine learning algorithm for classification and the calendar data of the planned event as input data for the trained machine learning algorithm for classification, wherein the classification result indicates that the trip of the user is required when the generated classification data indicates an expected personal presence of the user at the planned event.

According to another embodiment, the electronic navigation system is configured to perform the following: generating an update for the navigation data by the navigation module, the update comprising an update for the predicted time duration for the trip, and sending from the second computer server to the first computer server an update message comprising the update for the navigation data; in response to receiving the update message performing the following by the first server computer: updating the navigation data comprised in the dynamic reminder message according to the update for the navigation data, wherein the updating of the navigation data comprises updating the predicted time duration for the trip according to the update for the predicted time duration of the trip, repeating the sending of the dynamic reminder message after the updating of the navigation data comprised in the dynamic reminder message when the sending of the dynamic reminder message is executed, and rendering the updated navigation data on the display of the telecommunication device when the repeating of the sending of the dynamic reminder message is executed.

According to another embodiment, the first server computer is configured to monitor context information related to navigation data. The electronic navigation system is configured to perform the following: monitoring by the first server computer a context information related to the navigation data generated in response to the request, registering by the first server computer a change in the context information related to the navigation data generated in response to the request, in response to registering the change generating an update request by the first server computer, sending the update request from the first server computer to the second server computer. The generating of the updated navigation data by the navigation module is executed in response to the update request.

According to another embodiment, the second server computer is configured to monitor context information related to navigation data. The electronic navigation system configured to perform the following: monitoring by the second server computer a context information related to the navigation data generated in response the request, registering by the second server computer a change in the context information related to the navigation data generated in response to the request. The generating of the updated navigation data by the navigation module is executed in response to the registering of the change.

According to another embodiment, the context information related to the navigation data generated by the navigation module comprises at least one of the following: road traffic information, weather information, and availability of public transportation services.

According to another embodiment, the point of time is a point of time when the planned event is scheduled to start. The calendar data of the planned event comprises an indication of another point of time when the planned event is scheduled to end. The request comprises the indication of the point of time and the indication of the another point of time. The navigation data comprises navigation data for the trip to the event, navigation data for a return trip from the event. The navigation data for the return trip from the event comprises a predicted time duration for the return trip. The trip to the event is scheduled to end before the point of time. The return trip is scheduled to start after the another point of time. The electronic navigation system is configured to append to the calendar data of the planned event the navigation data by the first server computer.

According to another embodiment, the electronic navigation system is configured to receive by the first server computer a default geographic location of the user from the telecommunication device. The request comprises the default geographic location. The navigation data for the trip to the event specifies that the trip starts from the default geographic location and ends in the geographic location when calendar data of another event planned immediately before the planned event comprises a geographic location coinciding with the default geographic location or a predicted time duration for a return trip from the another event, wherein a time interval given by the predicted time duration for the return trip from the another event elapses earlier than the variable amount of time before the planned event. Wherein the navigation data for the trip to the event specifies that the trip starts from a geographic location comprised in the calendar data of the another event when the calendar data of the another event comprises a predicted time duration for another return trip from the another event, wherein a time interval given by the predicted time duration for the another return trip from the another event elapses later than the variable amount of time before the planned event.

According to another embodiment, the electronic navigation system is configured to receive by the telecommunication device an input of the user. The input comprises the default geographic location.

According to another embodiment, the telecommunication device comprises a geolocation tracking component. The electronic navigation system is configured to perform the following: registering by the geolocation tracking component a geographic location of the user outside time intervals of events which calendar data is stored in the electronic calendar, time intervals of trips made by the user to attend events which calendar data is stored in the electronic calendar, and time intervals of return trips made by the user to return from events which calendar data is stored in the electronic calendar; and generating by the telecommunication device the default geographic location using the registered geographic location.

According to another embodiment, the telecommunication device comprises a geolocation tracking component. The electronic navigation system is configured to perform the following: registering by the geolocation tracking component a geographic location of the user versus time during a trip of the user to the planned event, the trip of the user being executed according to the navigation data; sending by the telecommunication device the registered geographic location of the user versus time to the first server computer; determining by the first server computer an actual time duration of the trip of the user using the registered geographic location of the user versus time; appending by the first server computer the actual duration of the trip of the user to the calendar data of the planned event; generating by the first server computer a user specific trained machine learning algorithm using calendar data of events occurred in the past, the calendar data of the events occurred in the past being stored in the electronic calendar, wherein the generating of the user specific trained machine learning algorithm comprises training a machine learning algorithm to map a set of input data comprising navigation data for trips of the user to geographic locations of the events occurred in the past to a set of output data comprising actual time durations of the trips of the user to geographic locations of the events occurred in the past; generating by the first server computer another predicted time duration for the trip using the user specific trained machine learning algorithm and the navigation data as an input for the user specific trained machine learning algorithm; and correcting by the first server computer the predicted time duration for a difference of the predicted time duration and the another predicted time duration before the generating of the dynamic reminder by the first server computer.

According to another embodiment, the electronic navigation system is configured to perform the following: receiving from one or more public web services via the telecommunication network by the first server computer a context information related to the registered geographic location of the user versus time; appending by the first server computer the context information and the registered geographic location of the user versus time to calendar data of the planned event; and receiving from one or more public web services via the telecommunication network by the first server computer a context information related to the navigation data. The set of input data comprises registered geographic locations of the user versus time during trips of the user to the events occurred in the past and context information related to the registered geographic locations of the user versus time during the trips of the user to the events occurred in the past. The context information related to the navigation data is used as the input for the user specific trained machine learning algorithm in the generating by the first server computer of the another predicted time duration for the trip.

According to another embodiment, the geolocation tracking component comprises at least one of the following: a component configured to determine geographic location using signals generated by satellites orbiting the earth, a component configured to determine geographic using signals generated by base stations of digital cellular telecommunication networks, an inertial navigation system.

According to another embodiment, the navigation data comprises optional trip routes, wherein each optional trip route is generated for a type of transportation and has a predicted time duration of the trip to be executed according to the each optional trip route. The electronic navigation system is configured to select by the first server computer the longest predicted time duration of the trip out of the predicted time durations of the trip. The variable amount of time is given by the predicted time duration of the trip being the selected predicted time duration of the trip.

According to another embodiment the navigation data comprises optional trip routes. Each optional trip route is generated for a type of transportation and has a predicted time duration of the trip to be executed according to the each optional trip route. The electronic navigation system being configured to select by the first server computer according to a user transportation preference specification the type of transportation for which one of the optional trip routes is generated. The variable amount of time is given by the predicted time duration of the trip to be executed according to the optional trip route generated for the selected type of transportation.

According to another embodiment the electronic navigation system being configured to receive by the first server computer via the telecommunication device an input of the user. The input comprises the user transportation preference specification.

According to another embodiment the telecommunication device comprises a geolocation tracking component. The electronic navigation system is configured to: registering by the geolocation tracking component a geographic location of the user versus time during a trip of the user to the planned event, the trip of the user being executed according to the navigation data; sending by the telecommunication device the registered geographic location of the user versus time to the first server computer; determining by the first server computer a type of transportation used by the user for executing the trip of the user using the registered geographic location of the user versus time; appending by the first server computer the determined type of transportation to the calendar data of the planned event; generating by the first server computer a user specific trained machine learning algorithm using calendar data of events occurred in the past, the calendar data of the events occurred in the past being stored in the electronic calendar, wherein the generating of the user specific trained machine learning algorithm comprises training a machine learning algorithm to map a set of input data comprising navigation data for trips of the user to geographic locations of the events occurred in the past to a set of output data comprising types of transportation used by the user for executing trips of the user to geographic locations of the events occurred in the past; identifying a preferred type of transportation by the first server computer using the user specific trained machine learning algorithm and the navigation data as an input for the user specific trained machine learning algorithm; and generating by the first server computer the user transportation preference specification using the identified preferred type of transportation.

According to another embodiment the electronic navigation system being configured to: receiving from one or more public web services via the telecommunication network by the first server computer a context information related to the registered geographic location of the user versus time; appending by the first server computer the context information and the registered geographic location of the user versus time to calendar data of the planned event; and receiving from one or more public web services via the telecommunication network by the first server computer a context information related to the navigation data. The set of input data comprises registered geographic locations of the user versus time during trips of the user to the events occurred in the past and context information related to the registered geographic locations of the user versus time during the trips of the user to the events occurred in the past. The context information related to the navigation data is used as the input for the user specific trained machine learning algorithm in the identifying of the preferred type of transportation by the first server computer.

FIG. 1 illustrates an example electronic navigation system. The electronic navigation system comprises a mobile battery powered telecommunication device 160 being assigned to a user, a first server computer 150 for providing an electronic calendar 151 and functionalities for analysis of user behavior (e.g. machine learning algorithms 155, classifier algorithms 152), and a second server computer 140 comprising a navigation module 141. The navigation module is configured to generate navigation data. The navigation data can comprise a description of a trip route. The description of the trip route can comprise at list one of the following: a geographic location being a destination of the trip route, a geographic location being a starting point of the trip route, a type transportation to be used for execution of the trip route, an in indication of a point of time when execution of the trip according to the trip route is to be started, an indication of a point of time when execution the trip according to the trip route is expected to be completed, a predicted time duration of the trip executed according to the trip route. The type of transportation can by any of the following: bicycle, car, train, aircraft, bus, boat, bicycle, etc.

The telecommunication device 160 comprises a display 161 and a geolocation tracking component 162. The geolocation tracking component is operable for determining a geographic location of the telecommunication device 160 assigned to a user. Such a telecommunication device can be for instance a smartphone or a tablet. When a user travels with the telecommunication device, it can determine his location using the geolocation tracking component. The geolocation tracking component comprises at least one of the following: a component configured to determine geographic location using signals generated by satellites orbiting the Earth, a component configured to determine geographic using signals generated by base stations of digital cellular telecommunication networks (e.g. telecommunication network 100), an inertial navigation system. The display 161 can be used for rendering/displaying navigation data to the user. The display 161 can be a part of a user interface comprised in the telecommunication device 160. The user interface being configured to receive user inputs of a user. This can be done using a keyboard of the user interface, a touch screen functionality of the display, and/or via a speech recognition component of the user interface. The user input can specify/comprise a default geographic location of a default geographic location of the user and/or user transportation preference specification of the user. The user preference specification can specify a preferred type of transportation. For instance, the preferred type of transportation can be a car. In this case when the navigation module 141 generates an optional trip route to be executed using train and another optional trip route to be executed using car, then the first server computer 150 can select the optional trip route to be executed using car as specified in the user transportation preference specification.

The telecommunication device, the first server computer, and the second server computer being communicatively coupled by a telecommunication network 100. The telecommunication network can be one or more wired and/or wireless telecommunication networks. The wireless telecommunication network can be a digital cellular telecommunication network. The navigation system can be connected via the telecommunication network 100 and/or other telecommunication networks to other server computers providing public web services, e.g. a third server computer 170 providing a public web service 170. The public web services provide context information related to planning and/or execution of trips. The context information can comprise at least one of the following: road traffic information, weather information, and availability of public transportation services. The context information can be a prediction of the context information like weather prediction or actual context information like current weather. The context information can be actual context information related to a point of time in the past, e.g. yesterday's weather.

The electronic navigation system can comprise only the first server computer 150 and the battery powered telecommunication device assigned to a user. The network 100 is used for communicative coupling the telecommunication device to the first server computer and the electronic navigation system to web public services 141, 171 executed on server computers 140, 170. One of the web public services 141 can generate navigation data, while another one of web public services 171 can generate context information related to navigation data.

The telecommunication device 160 comprises a display 161, a computer processor 163, and a memory 164. The memory 164 stores a computer executable code which when executed by the computer processor 163 causes the computer processor 163 to execute steps (process blocks) of methods disclosed herein. The first server computer 150 comprises a computer processor 153, and a memory 154. The memory 154 stores a computer executable code which when executed by the computer processor 153 causes the computer processor 153 to execute steps (process blocks) of the methods disclosed herein. The second server computer 140 comprises a computer processor 142, and a memory 143. The memory 143 stores a computer executable code which when executed by the computer processor 142 causes the computer processor 142 to execute steps (process blocks) of the methods disclosed herein. The third server computer 170 comprises a computer processor 173, and a memory 174. The memory 174 stores a computer executable code which when executed by the computer processor 173 causes the computer processor 173 to execute steps (process blocks) of the methods disclosed herein.

The electronic calendar being configured to store calendar data of events (e.g. business and/or private meetings). The calendar data of an event comprises at least an indication of a point of time, a geographic location, and metadata being descriptive of the event, which is planned, ongoing, or occurred in the past. The point of time can be a point of time when the event is scheduled to start or started. The geographic lactation can be a specification of a place where the event is planned to be held, ongoing, or occurred. For instance, it can be a toponymical specification like a house number, a name of a street, a name of a town, and a name of country, or it can be geographical coordinate system (GCS) specification like 50.0782 N, 8.2398 E. The metadata can comprise at least one of the following: a list of participants of the event, a subject matter to be discussed (being discussed, or discussed) during the event, a name or organization where the event is planned, ongoing, or occurred, information being indicative whether a personal presence of a user is required at the event or he can participate in the event remotely e.g. using internet connection. The calendar data of the event can further comprise an indication of another point of time. The another point of time can be for instance a point of time when the planned event is scheduled to end, or ended. The calendar data can further comprise navigation data. The navigation data comprises navigation data for a trip to the event and as option navigation data for a trip from the event, wherein the trip from the event can be a return trip from the event. The navigation data for the trip to the event comprises a predicted time duration for the trip to the event. The navigation data for the trip to the event can further comprise an indication of a point of time when the trip to the event is scheduled to start and/or an indication of another point of time when the trip to the event is scheduled to end. The navigation data for the trip from the event comprises a predicted time duration for the trip from the event. The navigation data for the trip from the event can further comprise an indication of a point of time when the trip from the event is scheduled to start and/or an indication of another point of time when the trip from the event is scheduled to end. The navigation data for the trip to the event can specify that the trip to the event is scheduled to end within a predefined interval of time before the event (e.g. not earlier than 15 minutes before the beginning of the event and not later than the beginning of the event), or that the trip to the event is scheduled to end at the beginning of the event (i.e. when the predefined interval is equal to zero). The navigation data for the trip from the event can specify that the trip from the event is scheduled to start within another predefined interval of time after event (e.g. nor earlier than the end of the event and not later than 15 minutes after the end of the event), or that the trip from the event is scheduled to start immediately after the event (i.e. when the another predefined interval is equal to zero). Utilization of said predefined intervals can specify selection for trips of available public transportation services operated according to schedules.

The navigation data of the trip to the event (or the navigation data of the trip from the event) can comprise descriptions of optional trip routes to the event (or optional trip routes from the event). Each description of a respective optional trip route comprises at least one of the following a type of transportation for which that optional trip route is generated, a predicted time duration of the trip to be executed according to that optional trip route, an indication of a point of time when the trip when executed according to that optional trip route is scheduled to start, an indication of another point of time when the trip when executed according to that optional trip route is scheduled to end. For instance, navigation data can comprise one optional trip route to a planned event, which is to be executed by train and has a predicted time duration of 2 hours, and another optional trip route to the planned event, which is to be executed by car and has a predicted time duration of 1.5 hours.

The trip to an event can be generated starting from a default geographic location of a user or from a geographic location of an event being scheduled immediately before the event. The trip from the event can be generated ending in the default geographic location of the user or in a geographic location of another event being scheduled immediately after the event. The default geographic location of a user can be a single geographic location. Alternatively, the default geographic location can be specified as a schedule of default geographic location, according to which each geographic location specified in the schedule is valid for a respective time interval. For instance, a user can have his private address as a default geographic location outside office hours and an address of his employer as the default geographic location during office hours.

The electronic calendar can comprise calendar data related not only to the planning and execution of events, but calendar data related to actual behavior of a user during events, during trips executed from or to events, as well as outside time intervals of events, time intervals of trips made by the user form or to events. The calendar data related to the actual behavior of the user can be used for prediction of his behavior in the future and as a result thereof to optimize the work load of the first and/or second server computer, moreover it can be used for generating user specific trip planning using information received from public trip planners, public navigation systems, public web services providing context information related to planned trips or trips being executed. The actual behavior of the user can be determined by registering his geographic using the geolocation tracking component 162 of the telecommunication device 160. For instance when a geographic location of the user registered during an event is the same as a geographic location of the event, then it can be determined that the user has been present at the event personally. When the geographic locations are different than the user did not attend the event or he has remotely participated in the event e.g. using a video conference service. Registering of a geographic location of the user during his trip to an event can be used for determining which type of transportation is used for executing of the trip. For instance, when the geographic location of the user registered versus time during executing the trip coincides with a geographic location of motorways (railways), then he was travelling to the event by car (train). Another important information which can be extracted from registered geographic location of the user during his trip is an actual time duration of the trip. The registered actual durations of trips can be used for correction of predicted time durations of navigation data for trips generated by web public services 171 and/or by the navigation module 141. Correction of the navigation data for user specific aspects and/or user specific preferences can be used in conjunction with context information related to navigation data.

The aforementioned functionalities can be implemented by using various machine learning algorithms, which can be trained using actual user behavior registered during events occurred in the past. The machine learning algorithm can be for instance a machine learning algorithm for classification, a decision tree machine learning algorithm, an association rule machine learning algorithm, a machine learning algorithm based on an artificial neural network, a machine learning algorithm based on the inductive logic programming, a machine learning algorithm based on the representation learning, a machine learning algorithm based on the similarity and metric learning, and a rule-based machine learning algorithm.

Figure 2A:
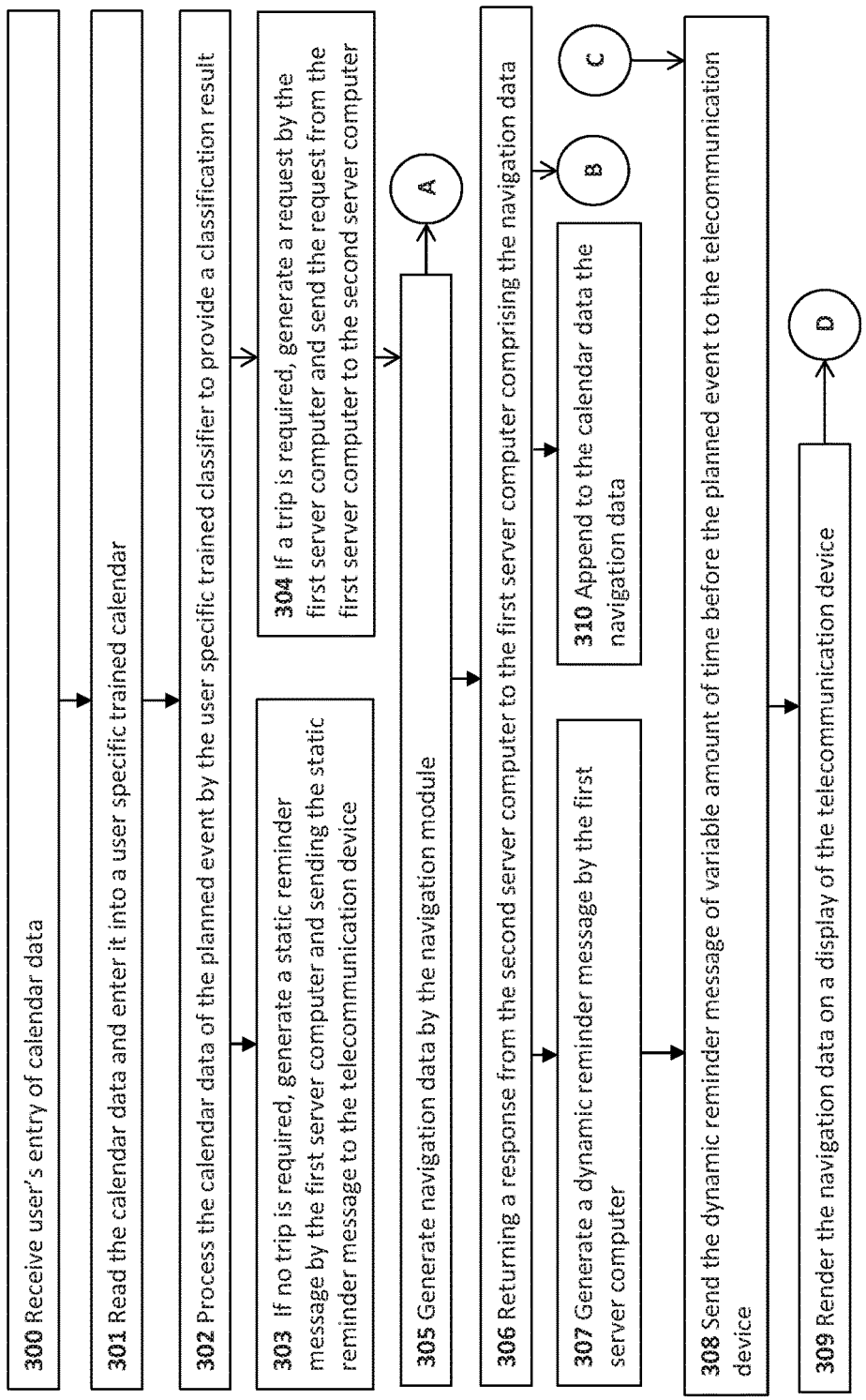
FIGS. 2a-c show a flowchart of an example method.
Figure 2B:
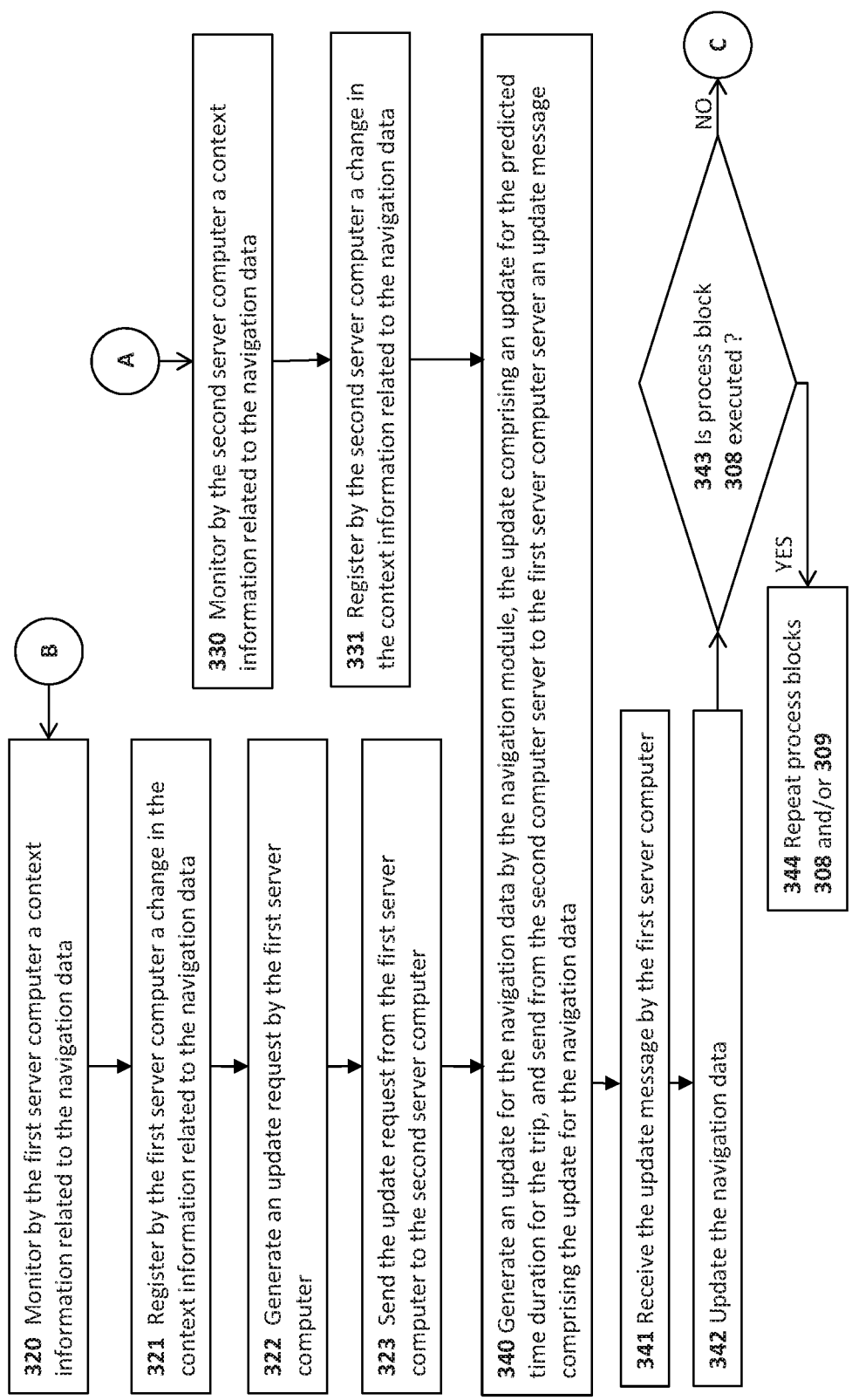
Figure 2C:
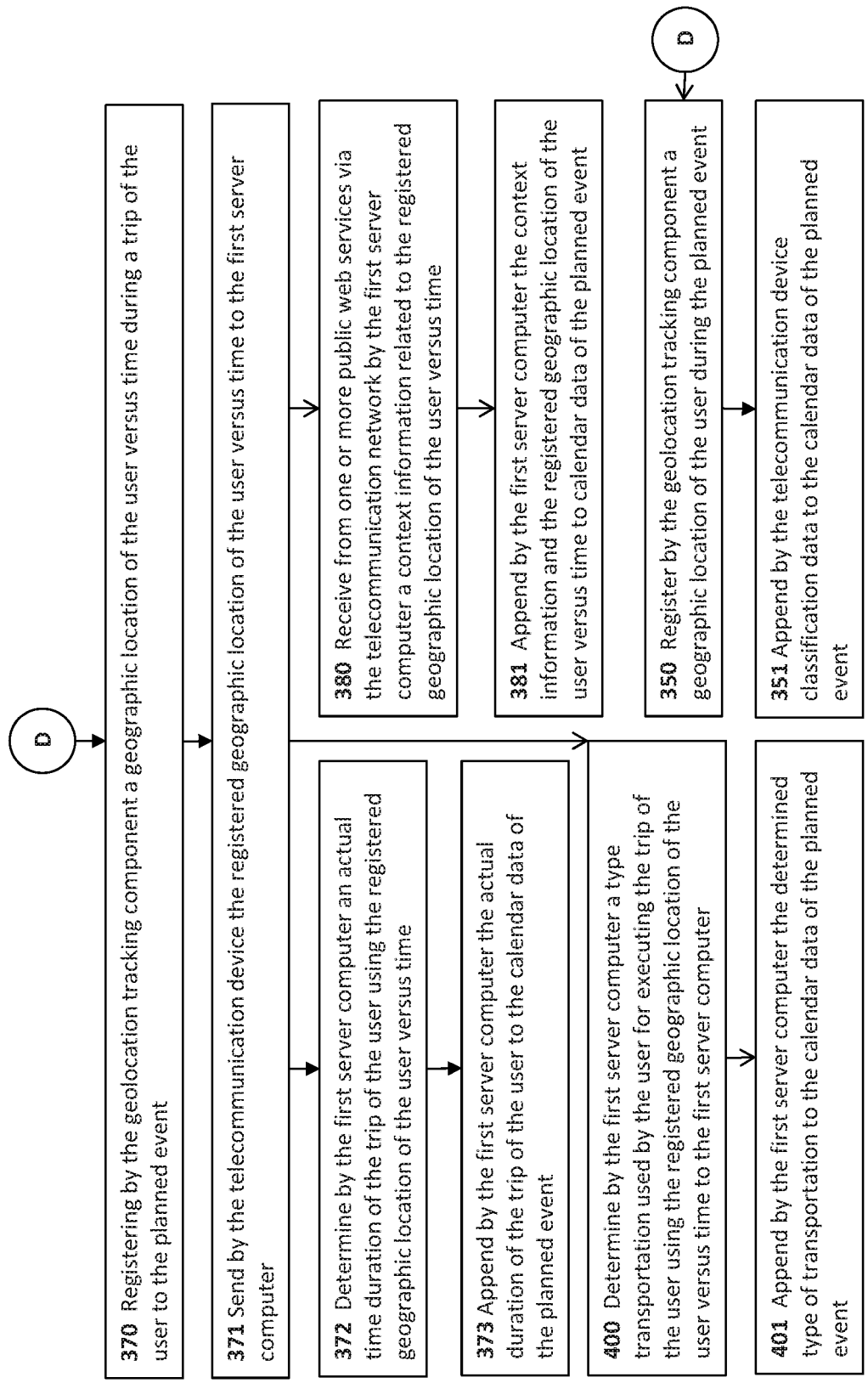

FIGS. 2a-c illustrate a flowchart of a method, which can be executed using the electronic navigation system. The method begins with process block 300. In process block 300 the first server computer receives user's entry of calendar data of a planned event into the electronic calendar via the telecommunication device. The calendar data of the planned event comprising at least an indication of a point of time (e.g. a point of time when the meeting beings), a geographic location, and metadata being descriptive of the planned event. The calendar data can further comprise an indication of another point of time (e.g. a point of time when the meeting ends). Process block 301 is executed in response to execution of process block 300. In process block 301 the first server computer reads the calendar data of the planned event and enters the calendar data into a user specific trained classifier. A component supporting execution of an algorithm of the user specific trained classifier can be comprised in the first server computer. Generation of the user specific trained classifier is explained further in the text in greater detail.

Process block 302 is executed after process block 301. In process block 302 the first server computer processes the calendar data of the planned event using the user specific trained classifier to provide a classification result. The classification result is indicative of whether a trip of the user is required to participate in the planned event. Process block 303 is executed after process block 302 when no trip is required. In process block 303 the first server computer generates a static reminder message and sends the generated static message to the telecommunication device in order to provide a reminder to the user a fixed amount of time (e.g. 15 minutes) before the planned event.

Process block 304 is generated after process block 303 when a trip is required. In process block 304 the first server computer generates a request comprising at least the geographic location. The request can further comprise any data comprised in the calendar data of the planned event. After the generation of the request the first server computer sends it to the second server computer. Process block 305 is executed in response to execution of process block 304. In process block 305 the navigation module generates navigation data comprising a predicted time duration for the trip. The navigation data can be navigation data for the trip to the event. The navigation module can further generate navigation data for a trip from the event, e.g. a return trip from the event. The navigation data for the trip from the event comprises a predicted time duration for the trip from the event. Process block 306 is executed after process block 305. In process block 306 a response comprising the navigation data for the trip to the event and as option for the trip from the event is returned from the second server computer to the first server computer.

Process block 307 is executed after process block 306. In process block 307 the first server computer generates a dynamic reminder message comprising the navigation data. Process block 308 is executed after process block 307. In process block 308 the first server computer and sends the dynamic reminder message of variable amount of time before the planned event to the telecommunication device, wherein the variable amount of time being given by the predicted time duration of the trip. The variable amount of time can be a time interval between a point of time, when the trip is scheduled to start according to the navigation data, and another point of time, when the event is scheduled to start. For instance, when the predicted time duration of the trip is 2 hours, then a reminder message of 2 hours before the planned event is sent in process block 308 in assumption that the trip can be started 2 hours before the planned event. This can be the case, when the navigation data is a description of a trip route to be made using a type of transportation, e.g. car, wherein the predicted time duration of the trip is a predicted time duration of execution of the trip according to the description of the trip route. Process block 309 is executed after process block 308. In process block 309 the telecommunication device renders (displays) on its display the navigation data. Process block 309 can be executed the variable amount of time before the planned event.

An optional process block 310 can be executed after process block 306. In process block 310 the first server computer appends navigation data (generated in process block 305) to the calendar data (generated in process block 300) of the planned event.

An optional process block 320 and the following process blocks 321-323 can be executed after process block 306. In process block 320 the first server computer monitors context information related to navigation data which can be comprised in calendar data of the planned event and/or generated in process block 305. The monitoring of the context information can be executed by requesting context information related to the navigation data from one or more web public services. The context information can be received from the one or more web public services on a periodic basis, alternatively or in addition the web public service can be configured to send a notification message to the first server computer when the context information changes. The context information can be for instance a weather prediction (or a schedule of public transportation services) related to the navigation data or to a trip route comprised in the navigation data. When weather forecast changes the public web service can send a notification message to the first server computer. When the navigation data comprises a flight executed by an airline company, then the first server computer can monitor changes in a schedule of the flight. This information can be available of a public web service of the airline company. The public web service of the airline company can be configured to send a notification message related to a change in the schedule of the flight in response to the change in the schedule of the flight.

Process block 321 is executed after process block 320. In process block 321 the first server computer registers a change in the context information related to the navigation data. Process block 322 is executed in response to execution of process block 321. In process block 322 the first server computer generates an update request. The update request can comprise the same data as the request generated in process block 304. The update request generated in process block 322 and the request generated in process block 304 can be the same. Process block 323 is executed after process block 322. In process block 323 the first server computer sends the update request from the first server computer to the second server computer.

Another optional process block 330 can be executed after process block 305. In process block 305 the second server monitors the context information related to the navigation data which can be comprised in calendar data of the planned event and/or generated in process block 305. The monitoring of the context information can be performed by the second server computer in the same way as by the first server computer in process block 320. Process block 331 is executed after process block 330. In process block 331 the second server computer registers a change in the context information related to the navigation data. Process block 331 can be executed by the second sever computer in the same way as process block 323 by the first server computer.

Another optional process block 340 can be executed in response to execution of process block 323 or process block 331. In process block 340 the navigation module generates an update for the navigation data having related context information which change is registered in process block 331 or in process block 321. The update for the navigation data comprises an update for the predicted time duration for the trip. Afterwards an update message comprising the update for the navigation data is sent from the second computer server to the first computer server. Process block 341 is executed after process block 340. In process block 341 the update message is received by the first server computer. Process block 342 is executed in response to execution of process block 341. In process block 342 the first server computer updates the navigation data comprised in the dynamic reminder message according to the update for the navigation data. The updating of the navigation data can comprise updating the predicted time duration for the trip according to the update for the predicted time duration of the trip. The first server computer can further update the navigation information comprised in the calendar data, when the calendar data comprises the navigation data. A decision process block 343 is executed after process block 342. Decision process block 343 can be executed by the first server computer. Execution of decision process block 343 causes execution of process block 308 when process block 308 is not yet executed and on condition that process block 307 is executed, otherwise it causes repetitive execution of process block 308, wherein the sending of the dynamic reminder message is repeated. After repetitive execution of process block 308 process block 309 is executed again, wherein the updated navigation data is rendered (displayed) on the display of the telecommunication device. In case when process block 308 is not yet executed and process blocks 307 and 342 are executed, then the dynamic reminder message sent in process block 308 comprising the updated navigation data, wherein the variable amount of time being given by the updated predicted time duration of the trip.

The updating of the navigation data can be illustrated using the aforementioned example. The first or the second server computer can register a change in the context information. The change is cancelling of the flight executed by the airline company. In this case, the navigation module generates an update for the navigation data using another flight and another predicted time duration of the updated navigation data.

Optional process block 350 can be executed after process block 309. In process block 350 the geolocation tracking component registers a geographic location of the user during the planned event. Process block 351 is executed after process block 350. In process block 351 the telecommunication device appends classification data to the calendar data of the planned event. The classification data is indicative of a personal presence of the user at the planned event when the geographic location of the user is the same as the geographic location of the planned event; otherwise, the classification data is indicative of a remote participation of the user in the planned event.

The calendar data of events occurred in the past can be used by the first server computer for the generation of the user specific trained classifier used in process block 302. The user specific trained classifier can be generated by training a machine learning algorithm for classification using calendar data of events comprising classification data. This calendar data can be stored in the electronic calendar. The machine learning algorithm for classification is trained to map a set of input data to a set of output data. The set of input data comprises indications of points of time of the events occurred in the past, metadata being descriptive of the events occurred in the past, and geographic locations of the events occurred in the past. The set of output data comprises classification data of the events occurred in the past. The set of input data and the set of output data constitute a set of a training data for training (executing a supervised learning procedure) of the machine learning algorithm for classification, wherein data related to one of the events comprised in the input data and classification data related to the same event comprised in the output data constitute an input/output pair of the training data. Process block 302 can comprise the following generating by the first server computer classification data using the trained machine learning algorithm for classification and the calendar data of the planned event as input data for the trained machine learning algorithm for classification. The classification result indicates that the trip of the user is required when the generated classification data indicates an expected personal presence of the user at the planned event (or in the other words when the generated classification data predicts personal presence of the user at the planned event).

Optional process block 370 can be executed after process block 309. In process block 370, the geolocation tracking component registers a geographic location of the user versus time during a trip of the user to the planned event, wherein the trip of the user is executed according to the navigation data. The registering of the geographic location can be triggered by the first server computer a fixed amount of time (e.g. 15 minutes) before a point of time when the trip is scheduled to start according to the navigation data. The registering of the geographic location can be stopped by the telecommunication device in response to determining that the last geographic location registered by geolocation tracking component is the same as the geographic location of the panned event. Process block 371 is executed after process block 370. In process block 371, the telecommunication device sends the registered geographic location of the user versus time to the first server computer. Afterwards the first server computer receives the registered geographic location of the user versus time.

Optional process block 372 is executed after process block 371. In process block 372, the first server computer determines an actual time duration of the trip of the user using the registered geographic location of the user versus time. A point of time determining the beginning of the trip can be a point of time when the geographic location of the user starts to change according to the registered geographic location of the user. Another point of time determining the end of the tip can be a point of time when the registering of the geographic location is stopped in process block 370. Process block 373 is executed after process block 372. In process block 372, the first server computer appends the actual duration of the trip of the user to the calendar data of the event. The calendar data of the event can be the calendar data generated in process block 300.

Another optional process block 380 can be executed after process block 371. In process block 380, the first server computer sends via the telecommunication network (e.g. 100) requests to one or more public services for context information related to the registered geographic location of the user versus time. For instance, one of the requests can be a request to provide actual weather conditions related to the trip made according to the registered geographic location. The weather conditions can for instance affect a driving stile of the user; as a result, he can complete the trip faster than the predicted time duration of the trip generated in process block 305. In response to the requests the one or more public services send responses to the first server computer, the responses comprise the context information related to the registered geographic location of the user versus time. The first server computer receives the responses comprising the context information. Process block 381 is executed after process block 380. In process block 381, the first server computer appends to the calendar data of the event the received context information and the registered geographic location of the user versus time. The calendar data of the event can be the calendar data generated in process block 300.

Yet another optional process block 400 can be executed after process block 371. In process block 400, the first server computer determines a type of transportation used by the user when he was executing the trip, wherein the first server computer uses the registered geographic location of the user versus time for the determination of the type of transportation. As mentioned above, the determination of the type of transportation can be done on a basis of comparison of the registered geographic location versus time (i.e. trajectory) with maps of motorways, railroads, flights connecting airports, etc. Process block 401 is executed after process block 400. In process block 401 the first server computer appends the determined type of transportation to the calendar data of the event. The calendar data of the event can be the calendar data generated in process block 300.

As mentioned above, data being descriptive of user behavior can be used for generating user specific navigation data. In particular, the first server computer can be operable for generating a user specific trained machine learning algorithm using calendar data of events occurred in the past. The calendar data of the events occurred in the past can be stored in the electronic calendar. The generating of the user specific trained machine learning algorithm comprises training of a machine learning algorithm to map a set of input data to a set of output data. The set of input data comprises navigation data for trips of the user to geographic locations of the events occurred in the past. The set of input data can comprise further registered geographic locations of the user versus time during trips of the user to the events occurred in the past and context information related to the registered geographic locations of the user versus time during the trips of the user to the events occurred in the past. The set of output data comprises types of transportation used by the user for executing trips of the user to geographic locations of the events occurred in the past. Alternatively or in addition the set of output data comprises actual time durations of the trips of the user to geographic locations of the events occurred in the past. The set of input data and the set of output data constitute a set of a training data for training (executing a supervised learning procedure) of the machine learning algorithm, wherein data being related to one of the events and being comprised in the input data and data being related to the same event and being comprised in the output data constitute an input/output pair of the training data.

Figure 3:
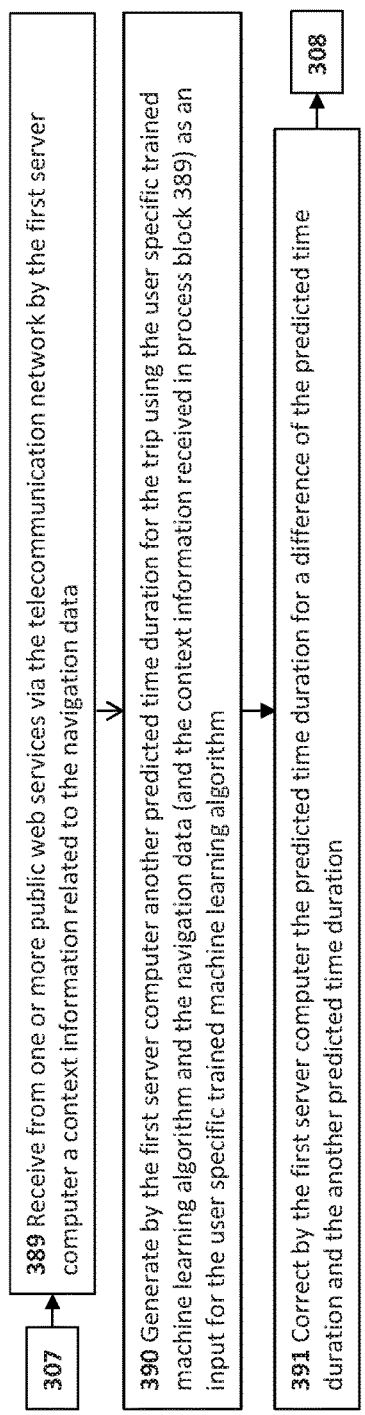
FIG. 3 shows a flowchart of an example method.

FIG. 3 illustrate a sequence of process blocks which can be executed between process blocks 307 and 308. The sequence of process blocks begins with an optional process block 389. In process block 389 the first server computer sends to one or more public web services via the telecommunication network requests for context information related to the navigation data. The navigation data can be generated in process block 305. At least one of the public web services used in process block 389 can be the same as the public web service used in process block 380. The context information used in process block 389 is a prediction of context information for a scheduled trip to be executed according to the navigation data. For instance, it can be a prediction of the weather conditions which can affect the driving style of the user and as a result thereof cause his late arrival to the planned event. In response to the request, the first server computer receives the context information from the one or more public web services.

Process block 390 is executed after process block 389 when the latter is executed, otherwise process block 390 is executed after process block 307. In process block 390 the first server computer generates another predicted time duration of the trip using the user specific trained machine learning algorithm and the navigation data as an input for the user specific trained machine learning algorithm. The context information received in process block 389 is used as the input for the user specific trained machine learning algorithm as well when process block 389 is executed. The another predicted time duration of the trip is an output of the user specific machine learning algorithm. Process block 391 is executed after process block 390. In process block 391, the first server computer corrects the predicted time duration ($t_{OLD}$) for a difference of the predicted time duration generated in process block 305 ($t_{OLD}$) and the another predicted time duration generated in process block 390 ($t_{NEW}$). The corrected predicted time duration for the trip ($t_{CORR}$) is used in process block 308 and in any further of the process blocks. The generation of the corrected predicted time duration for the trip can be executed according to the following equation: $t_{CORR}=t_{OLD}-(t_{OLD}-t_{NEW})+t_{SAFETY\ MARGIN}$. The parameter $t_{SAFETY\ MARGIN}$ is used to provide a safety margin for an uncertainty the another predicted time duration generated by the user specific trained machine learning algorithm. When this parameter is equal to zero, then execution of process block 390 is equivalent to substituting in the navigation data of the predicted time duration generated in process block 305 by the another predicted time duration generated in process block 389.

Figure 4:
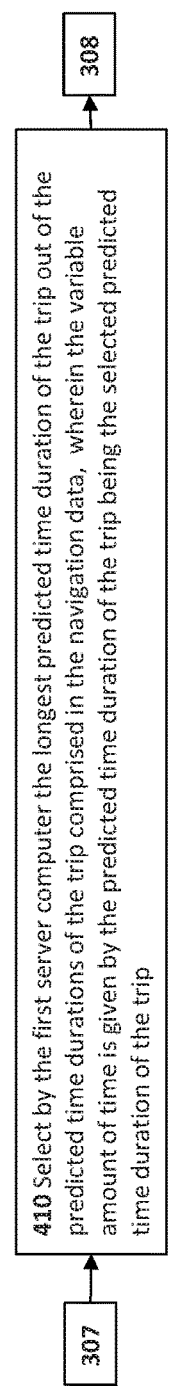
FIG. 4 shows a flowchart of an example method.

FIG. 4 illustrates another process block 410, which can be executed between process blocks 307 and 308. As mentioned above, the navigation data generated in process block 305 can comprise optional trip routes. Each optional trip route is generated for a respective transportation mean and has a predicted time duration of the trip to be executed according to the each optional trip route. In process block 410 the first server computer selects the longest predicted time duration of the trip out of the predicted time durations of the optional routes of the trip comprised in the navigation data The selected predicted time duration for the trip is used in process block 308 and in any further of the process blocks.

Figure 5A:
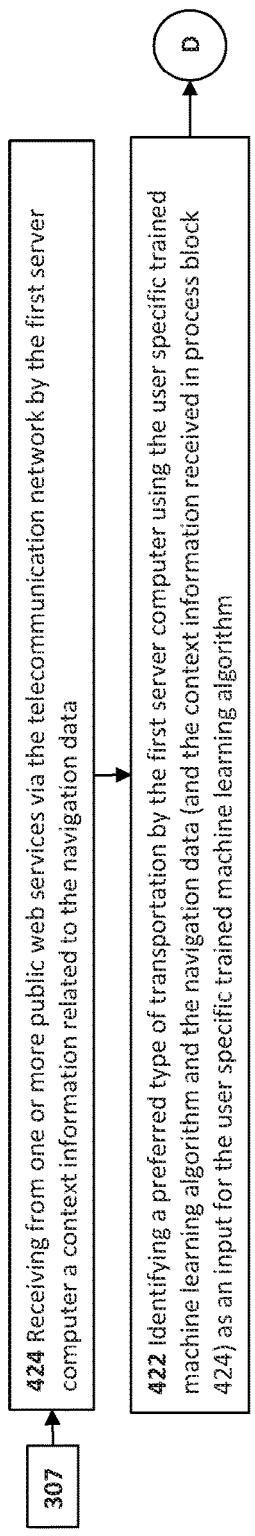
FIGS. 5a and 5b show a flowchart of an example method.
Figure 5B:
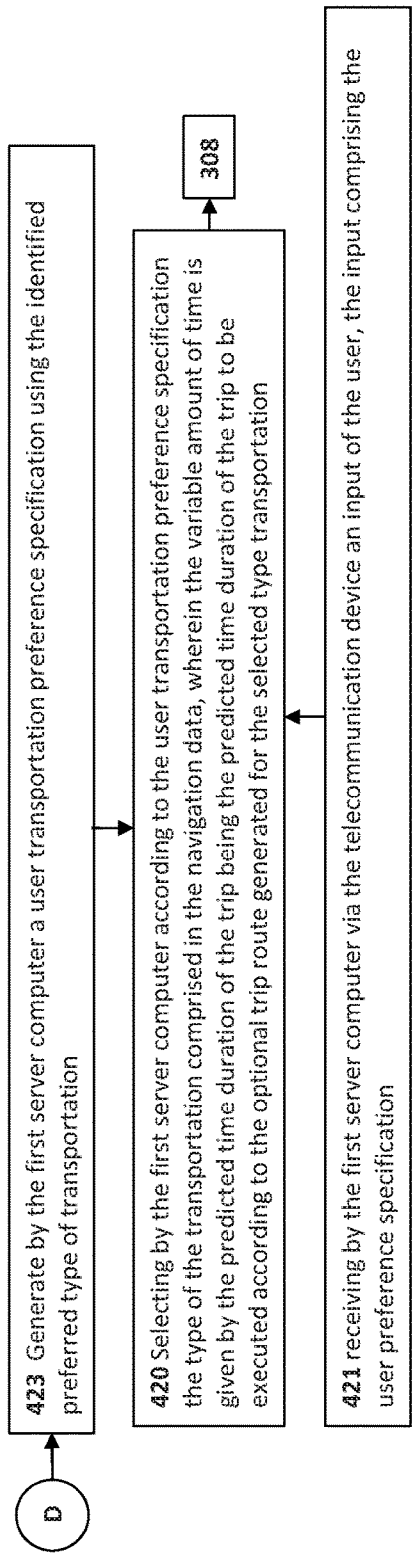

FIGS. 5a and 5b illustrate another sequence of process blocks which can be executed between process blocks 307 and 308. The sequence begins with optional process block 424. Optional process block 424 is executed in the same way as the aforementioned process block 389. Process block 422 is executed after process block 424 when the latter is executed, otherwise process block 422 is executed after process block 424. In process block 422 the first server computer identifies a preferred type of transportation using the aforementioned user specific trained machine learning algorithm and the navigation data as an input for the user specific trained machine learning algorithm. The preferred type of transportation is an output of the user specific trained machine learning algorithm. Alternatively the user specific trained machine learning algorithm can generate an output being a ranking of the types of transportation, wherein the type of transportation having the highest ranking among the types of transportation for which optional trip routes are specified in navigation data is to be used for the trip to be executed using the navigation data. The context information received in process block 424 is used as the input for the user specific trained machine learning algorithm as well when process block 424 is executed. Process block 423 is executed after process block 422. In process block 423, the first server computer generates a user transportation preference specification using the preferred type of transportation identified in process block 422 (or using the ranking of the types of transportation generated in process bock 422). The user transportation preference specification can specify that when more than one optional trip routes are comprised in the navigation data and one of the trip routes is generated for the preferred type of transportation, then the one of the trip routes and the preferred type of transportation are ought to be selected according to the user transportation preference specification. Alternatively the user transportation preference specification can specify that the type of transportation having the highest ranking among the types of transportation for which optional trip routes are specified in navigation data is to be used for the trip to be executed using the navigation data.

Process block 420 is executed after process block 423. In process block 420, the first server computer selects according to the user transportation preference specification the type of transportation for which one of the optional trip routes is generated. All of the optional trip routes can be comprised in the navigation data generated in process block 305. The variable amount of time used in process block 308 is given by the predicted time duration of the trip to be executed according to the optional trip route generated for the selected type of transportation.

Execution of process blocks 424, 422, and 423 can be skipped, when the user transportation preference specification is received in process block 421. Process block 421 can be executed any time before process block 420. Execution of process block 307 is not required for execution of process block 421. In process block 421, the first server computer receives via the telecommunication device an input of the user. The input comprises the user transportation preference specification.

Figure 6:
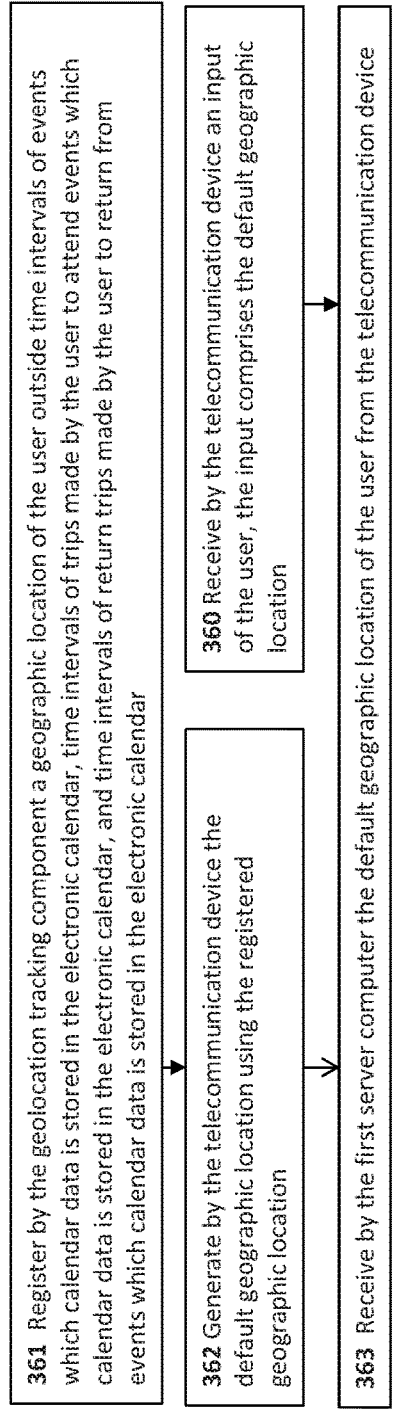
FIG. 6 shows a flowchart of an example method.

FIGS. 6 and 5b illustrate a sequence of process blocks for determination of the default geographic location of the user. The sequence can begin either with process block 361 or with process block 360. In process block 361 the geolocation tracking component registers a geographic location of the user outside time intervals of events which calendar data is stored in the electronic calendar, time intervals of trips made by the user to attend events which calendar data is stored in the electronic calendar, and time intervals of return trips made by the user to return from events which calendar data is stored in the electronic calendar. The geolocation tracking component can be operated by the telecommunication device using the calendar data. Process block 362 is executed after process block 361. In process block 362 the telecommunication device generates the default geographic location of the user from using the registered geographic location. The default geographic location can be determined using a statistical approach, because not every event attended by the user can have calendar data in the electronic calendar. A geographic location at which the user stays longer than at any other geographic location is determined to be his default geographic location. When there is a need to determine at least two default geographic locations one during office hours and another outside the office hours, then process blocks 361 and 362 can executed as a separate sequence during office hours and as another separate sequence outside office hours. Afterwards a default geographical location is generated by combining results of two sequences. The generated default geographical location comprises a default geographical location during the office hours and a default geographical location outside the office hours.

Process block 363 is executed after process block 362. In process block 363, first server computer receives the default geographic location of the user from the telecommunication device. Alternatively, the telecommunication device can receive an input of the user in process block 360. The input comprises the default geographic location. In the other words the user can specify his default geographic location or locations manually.

The request generated in process block 304 can comprise the default geographic location. The request can further comprise navigation data for a return trip from another event being planned immediately before the planned event. The navigation module can be configured to generate the navigation data for the planned event in accordance with the navigation data for the return trip form the another event. In particular, the navigation data for the trip to the event generated in process block 305 can specify that the trip starts (or optional trip routes comprised in the navigation data start) from the default geographic location of the user and end in the geographic location of the planned event when calendar data of the another event comprises a geographic location coinciding with the default geographic location or a predicted time duration for a return trip from the another planned event, wherein a time interval given by the predicted time duration for the return trip from the another event elapses earlier than the variable amount of time before the planned event. The navigation data for the trip to the event specifies that the trip starts (or optional trip routes comprised in the navigation data start) from a geographic location comprised in the calendar data of the another event when the calendar data of the another event comprises a predicted time duration for a another return trip from the another event, wherein a time interval given by the predicted time duration for the another return trip from the another planned event elapses later than the variable amount of time before the planned event.

A point of time when the time interval given by the predicted time duration for the return trip from the another planned event elapses can be a point of time when the (another) return trip (or the optional trip route comprised in the (another) return trip and selected according to the user transportation preference specification) from the another event is scheduled to end.

The first server computer can be configured to perform the following when receiving a response from the second server computer comprising the navigation data of the trip to the event which starts in a geographic location of another event being planned immediately before the planned event: deleting (or marking as cancelled) a return trip from the another event in the navigation data comprised in the calendar data of the another event, when the navigation data comprises the return trip from the another event.

The preceding figures and accompanying description illustrate the example processes and computer implementable techniques. But the example environment (or their software or other components) contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, the example environment may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "telecommunication system" and "server computer" refer to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS. MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The "user interface" may be a "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The invention claimed is:

1. An electronic navigation system, comprising:
   a mobile battery powered telecommunication device being assigned to a user;
   a first server computer for providing an electronic calendar and a user specific trained classifier, the electronic calendar being configured to store calendar data of events, and the user specific trained classifier comprising classification data indicative of whether the user was physically present at events having occurred in the past or participated remotely in the events having occurred in the past; and
   a second server computer comprising a navigation module,
   the telecommunication device, the first server computer and the second server computer being communicatively coupled by a telecommunication network,
   the electronic navigation system being configured to
      receive a user's entry of calendar data of a planned event into the electronic calendar via the telecommunication device, the calendar data of the planned event comprising at least an indication of a point of time, a geographic location, and metadata being descriptive of the planned event,
      in response to the user's entry of the calendar data, read the calendar data of the planned event by the first server computer and enter the calendar data into the user specific trained classifier,
      process the calendar data of the planned event by the user specific trained classifier to provide a classification result, the classification result being indicative of whether or not a trip of the user is required to participate in the planned event based on whether physical presence of the user is expected or the user can participate remotely,
      in response to the classification result indicating that the user can participate remotely, generate a static reminder message by the first server computer and send the static reminder message to the telecommunication device in order to provide a reminder to the user a fixed amount of time before the planned event, and
      in response to the classification result indicating that physical presence of the user is expected, generate a request by the first server computer, the request comprising at least the geographic location, and send the request from the first server computer to the second server computer,
         in response to the request, generate navigation data by the navigation module, the navigation data comprising a predicted time duration for the trip, and return a response from the second server computer to the first server computer, the response comprising the navigation data,
         generate a dynamic reminder message by the first server computer, the dynamic reminder message comprising the navigation data, and send the dynamic reminder message from the first server to the telecommunication device a variable amount of time before the planned event, the variable amount of time being based on the predicted time duration of the trip, and render the navigation data on a display of the telecommunication device.

2. The electronic navigation system of claim 1, wherein the telecommunication device comprises a geolocation tracking component, and
the electronic navigation system being configured to
register by the geolocation tracking component a geographic location of the user during the planned event,
append by the telecommunication device classification data to the calendar data of the planned event, the classification data being indicative of physical presence of the user at the planned event when the geographic location of the user is the same as the geographic location of the planned event, otherwise the classification data being indicative of remote participation of the user in the planned event,
generate by the first server computer the user specific trained classifier by training a machine learning algorithm for classification using calendar data of events having occurred in the past, the calendar data of the events having occurred in the past being stored in the electronic calendar, wherein
the training comprises training the machine learning algorithm for classification to map a set of input data to a set of output data,
the set of input data comprises indications of points of time of the events having occurred in the past, metadata being descriptive of the events having occurred in the past, and geographic locations of the events having occurred in the past, and
the set of output data comprises classification data of the events having occurred in the past,
wherein the processing of the calendar data by the user specific trained classifier comprises generating by the first server computer classification data using the trained machine learning algorithm for classification and the calendar data of the planned event as input data for the trained machine learning algorithm for classification, wherein the classification result indicates that the trip of the user is required in response to the generated classification data indicating that physical presence of the user is expected at the planned event.

3. The electronic navigation system of claim 1, the electronic navigation system being configured to:
generate an update for the navigation data by the navigation module, the update comprising an update for the predicted time duration for the trip, and sending from the second computer server to the first computer server an update message comprising the update for the navigation data,
in response to receiving the update message, the first server computer being configured to
update the navigation data comprised in the dynamic reminder message according to the update for the navigation data, wherein the updating of the navigation data comprises updating the predicted time duration for the trip according to the update for the predicted time duration of the trip,
repeat the sending of the dynamic reminder message after the updating of the navigation data comprised in the dynamic reminder message in response to the updating of the navigation data comprised in the dynamic reminder message being executed, and
render the updated navigation data on the display of the telecommunication device in response to the repeating of the sending of the dynamic reminder message being executed.

4. The electronic navigation system of claim 3, wherein the first server computer is configured to monitor context information related to navigation data, and
the electronic navigation system is configured to:
monitor by the first server computer a context information related to the navigation data generated in response to the request,
register by the first server computer a change in the context information related to the navigation data generated in response to the request, and
in response to registering the change, generate an update request by the first server computer and send the update request from the first server computer to the second server computer, wherein the generating of the updated navigation data by the navigation module is executed in response to the update request.

5. The electronic navigation system of claim 3, wherein the second server computer is configured to monitor context information related to navigation data, and
the electronic navigation system is configured to
monitor by the second server computer a context information related to the navigation data generated in response to the request, and
register by the second server computer a change in the context information related to the navigation data generated in response to the request, wherein the generating of the updated navigation data by the navigation module is executed in response to the registering of the change.

6. The electronic navigation system of claim 5, wherein the context information related to the navigation data generated by the navigation module comprises at least one of road traffic information, weather information, and availability of public transportation services.

7. The electronic navigation system of claim 1, wherein
the point of time is a point of time when the planned event is scheduled to start,
the calendar data of the planned event comprises an indication of another point of time when the planned event is scheduled to end,
the request comprises the indication of the point of time and the indication of the another point of time,
the navigation data comprises navigation data for the trip to the event and navigation data for a return trip from the event, the navigation data for the return trip from the event comprising a predicted time duration for the return trip, wherein the trip to the event is scheduled to end before the point of time and the return trip is scheduled to start after the another point of time, and
the electronic navigation system is configured to append to the calendar data of the planned event the navigation data by the first server computer.

8. The electronic navigation system of claim 7, wherein the electronic navigation system is configured to receive by the first server computer a default geographic location of the user from the telecommunication device,
the request comprises the default geographic location,
the navigation data for the trip to the event specifies that the trip starts from the default geographic location and ends in the geographic location when calendar data of another event planned immediately before the planned event comprises a geographic location coinciding with the default geographic location or a predicted time duration for a return trip from the another event, a first time interval given by the predicted time duration for the return trip from the another event elapses earlier than the variable amount of time before the planned event, the navigation data for the trip to the event specifies that the trip starts from another geographic location comprised in the calendar data of the another event when the calendar data of the another event comprises another predicted time duration for another return trip from the another event, and a second time interval given by the another predicted time duration for the another return trip from the another event elapses later than the variable amount of time before the planned event.

9. The electronic navigation system of claim 8, the electronic navigation system being configured to receive by the telecommunication device an input of the user, the input comprising the default geographic location.

10. The electronic navigation system of claim 8, wherein the telecommunication device comprises a geolocation tracking component, and the electronic navigation system is configured to register by the geolocation tracking component a geographic location of the user outside time intervals of events which calendar data is stored in the electronic calendar, time intervals of trips made by the user to attend events which calendar data is stored in the electronic calendar, and time intervals of return trips made by the user to return from events which calendar data is stored in the electronic calendar, and generate by the telecommunication device the default geographic location using the registered geographic location.

11. The electronic navigation system of claim 1, wherein the telecommunication device comprises a geolocation tracking component, and the electronic navigation system is configured to register by the geolocation tracking component a geographic location of the user versus time during a trip of the user to the planned event, the trip of the user being executed according to the navigation data, send by the telecommunication device the registered geographic location of the user versus time to the first server computer, determine by the first server computer an actual time duration of the trip of the user using the registered geographic location of the user versus time, append by the first server computer the actual time duration of the trip of the user to the calendar data of the planned event, generate by the first server computer a user specific trained machine learning algorithm using calendar data of events having occurred in the past, the calendar data of the events having occurred in the past being stored in the electronic calendar, wherein the generating of the user specific trained machine learning algorithm comprises training a machine learning algorithm to map a set of input data comprising navigation data for trips of the user to geographic locations of the events having occurred in the past to a set of output data comprising actual time durations of the trips of the user to the geographic locations of the events having occurred in the past, and generate by the first server computer another predicted time duration for the trip using the user specific trained machine learning algorithm and the navigation data as an input for the user specific trained machine learning algorithm, and correct by the first server computer the predicted time duration for a difference of the predicted time duration and the another predicted time duration before the generating of the dynamic reminder message by the first server computer.

12. The electronic navigation system of claim 11, the electronic navigation system being configured to:

receive from one or more public web services via the telecommunication network by the first server computer a context information related to the registered geographic location of the user versus time, append by the first server computer the context information and the registered geographic location of the user versus time to calendar data of the planned event, and receive from one or more public web services via the telecommunication network by the first server computer a context information related to the navigation data, wherein the set of input data comprises registered geographic locations of the user versus time during trips of the user to the events having occurred in the past and context information related to the registered geographic locations of the user versus time during the trips of the user to the events having occurred in the past, and the context information related to the navigation data is used as the input for the user specific trained machine learning algorithm in the generating by the first server computer of the another predicted time duration for the trip.

13. The electronic navigation system of claim 11, wherein the geolocation tracking component comprises at least one of a first component configured to determine geographic location using signals generated by satellites orbiting the earth, a second component configured to determine geographic location using signals generated by base stations of digital cellular telecommunication networks, and a third component configured to determine geographic location using an inertial navigation system.

14. The electronic navigation system of claim 1, wherein the navigation data comprises optional trip routes, wherein each optional trip route is generated for a type of transportation and has a respective predicted time duration of the trip to be executed according to the each optional trip route, and the electronic navigation system is configured to select by the first server computer a longest predicted time duration of the trip out of the respective predicted time durations of the trip, wherein the variable amount of time is based on the predicted time duration of the trip being the selected longest predicted time duration of the trip.

15. The electronic navigation system of claim 1, wherein the navigation data comprises optional trip routes, wherein each optional trip route is generated for a type of transportation and has a respective predicted time duration of the trip to be executed according to the each optional trip route, and the electronic navigation system is configured to select by the first server computer according to a user transportation preference specification the type of transportation for which one of the optional trip routes is generated, wherein the variable amount of time is based on the predicted time duration of the trip to be executed according to the one of the optional trip routes generated for the selected type of transportation.

16. The electronic navigation system of claim 15, the electronic navigation system being configured to receive by the first server computer via the telecommunication device an input of the user, the input comprising the user transportation preference specification.

17. The electronic navigation system of claim 15, wherein the telecommunication device comprises a geolocation tracking component, and
the electronic navigation system is configured to
register by the geolocation tracking component a geographic location of the user versus time during a trip of the user to the planned event, the trip of the user being executed according to the navigation data,
send by the telecommunication device the registered geographic location of the user versus time to the first server computer,
determine by the first server computer a type of transportation used by the user for executing the trip of the user using the registered geographic location of the user versus time,
append by the first server computer the determined type of transportation to the calendar data of the planned event,
generate by the first server computer a user specific trained machine learning algorithm using calendar data of events having occurred in the past, the calendar data of the events having occurred in the past being stored in the electronic calendar, wherein the generating of the user specific trained machine learning algorithm comprises training a machine learning algorithm to map a set of input data comprising navigation data for trips of the user to geographic locations of the events having occurred in the past to a set of output data comprising types of transportation used by the user for executing the trips of the user to the geographic locations of the events having occurred in the past,
identify a preferred type of transportation of the user by the first server computer using the user specific trained machine learning algorithm and the navigation data as an input for the user specific trained machine learning algorithm, and
generate by the first server computer the user transportation preference specification using the identified preferred type of transportation of the user.

18. The electronic navigation system of claim 17, the electronic navigation system being configured to:
receive from one or more public web services via the telecommunication network by the first server computer a context information related to the registered geographic location of the user versus time,
append by the first server computer the context information and the registered geographic location of the user versus time to calendar data of the planned event, and
receive from one or more public web services via the telecommunication network by the first server computer a context information related to the navigation data, wherein
the set of input data comprises registered geographic locations of the user versus time during trips of the user to the events having occurred in the past and context information related to the registered geographic locations of the user versus time during the trips of the user to the events having occurred in the past, and
the context information related to the navigation data is used as the input for the user specific trained machine learning algorithm in the identifying of the preferred type of transportation of the user by the first server computer.

19. A computer-implemented method for navigation using an electronic navigation system, the electronic navigation system comprising a mobile battery powered telecommunication device being assigned to a user, a first server computer for providing an electronic calendar and a user specific trained classifier, the electronic calendar being configured to store calendar data of events, and a second server computer comprising a navigation module, the telecommunication device, the first server computer and the second server computer being communicatively coupled by a telecommunication network, the method comprising:
receiving a user's entry of calendar data of a planned event into the electronic calendar via the telecommunication device, the calendar data of the planned event comprising at least an indication of a point of time, a geographic location, and metadata being descriptive of the planned event;
in response to the user's entry of the calendar data, reading the calendar data of the planned event by the first server computer and entering of the calendar data into the user specific trained classifier, the user specific trained classifier comprising classification data indicative of whether the user was physically present at events having occurred in the past or participated remotely in the events having occurred in the past;
processing of the calendar data of the planned event by the user specific trained classifier to provide a classification result, the classification result being indicative of whether or not a trip of the user is required to participate in the planned event based on whether physical presence of the user is expected or the user can participate remotely;
in response to the classification result indicating that the user can participate remotely, generating a static reminder message by the first server computer and sending the static reminder message to the telecommunication device in order to provide a reminder to the user a fixed amount of time before the planned event; and
in response to the classification result indicating that physical presence of the user is expected, generating a request by the first server computer, the request comprising at least the geographic location, and sending the request from the first server computer to the second server computer,
in response to the request, generating navigation data by the navigation module, the navigation data comprising a predicted time duration for the trip, and returning a response from the second server computer to the first server computer, the response comprising the navigation data,
generating a dynamic reminder message by the first server computer, the dynamic reminder message comprising the navigation data, and sending the dynamic reminder message from the first server to the telecommunication device a variable amount of time before the planned event, the variable amount of time being based on the predicted time duration of the trip, and
rendering the navigation data on a display of the telecommunication device.

20. A non-transitory computer readable medium having stored thereon computer executable code for execution by a computer processor controlling an electronic navigation system, wherein execution of instructions of the computer executable code causes the computer processor to execute the computer-implemented method of claim 19.

* * * * *